United States Patent Office 3,513,295
Patented May 19, 1970

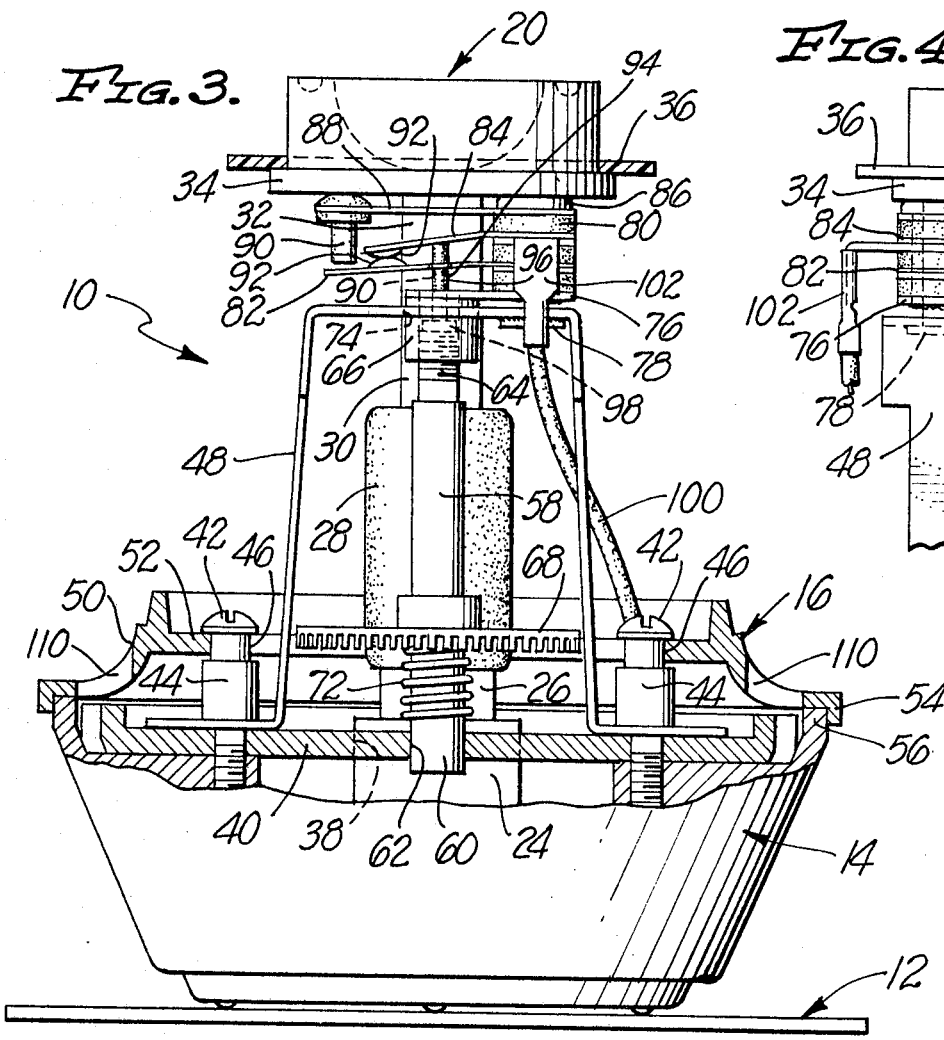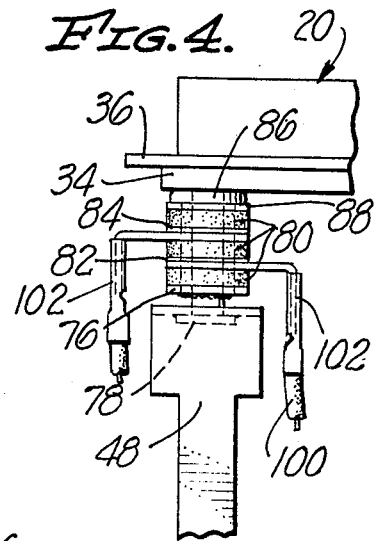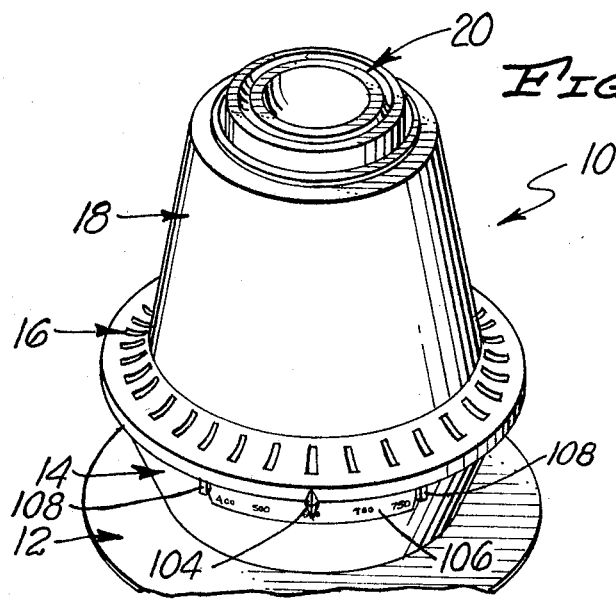

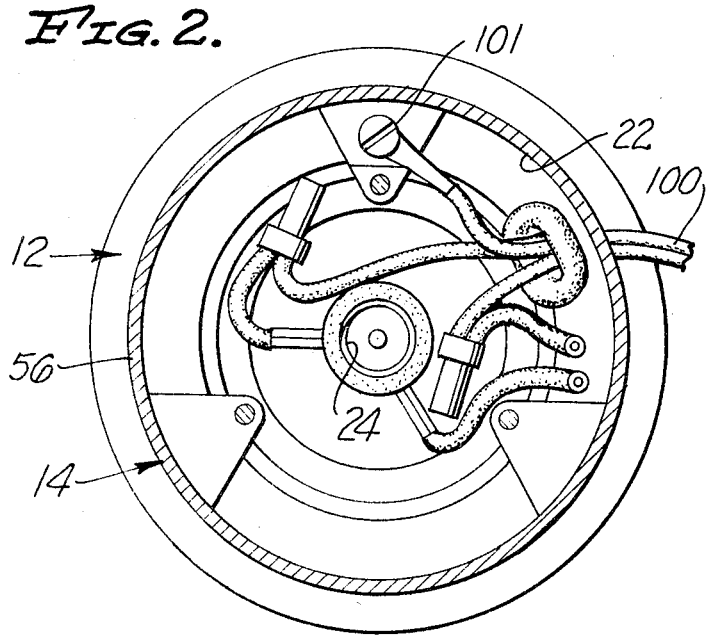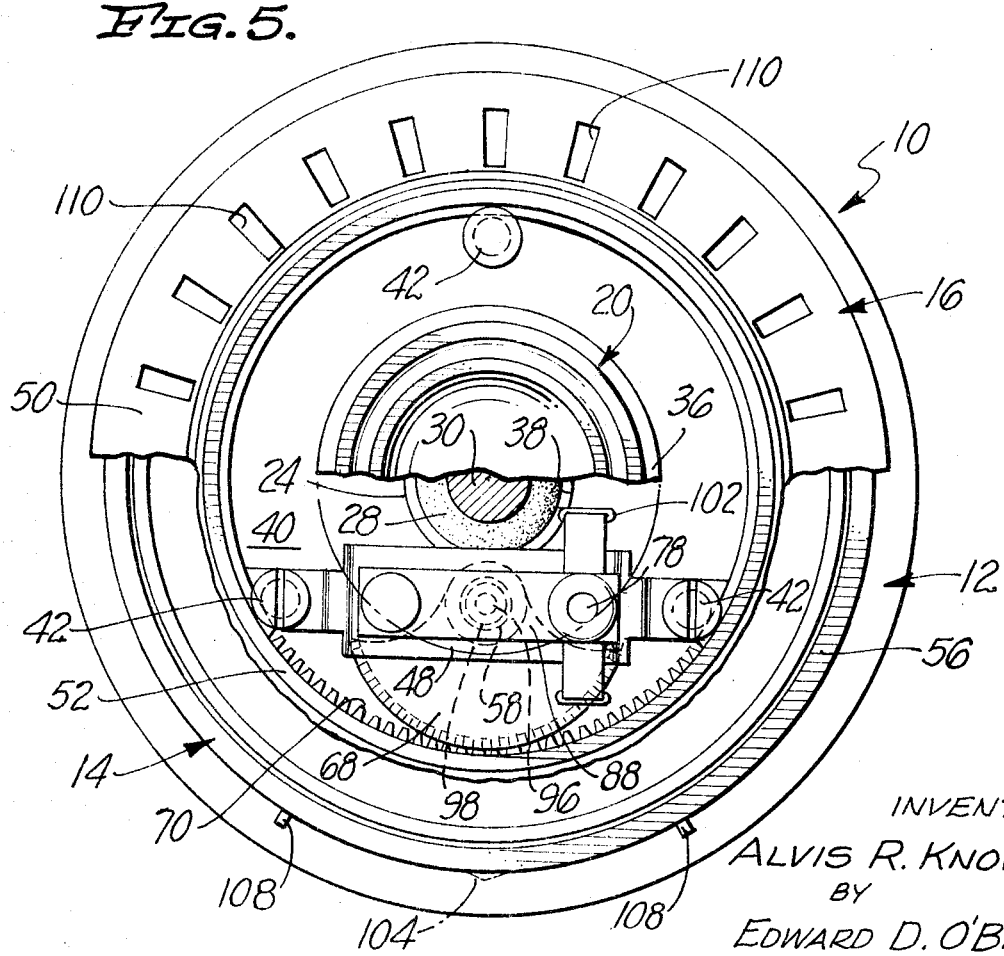

3,513,295
DEVICE FOR HEATING A COMPOSITION AND MAINTAINING THE HEATED COMPOSITION AT A SUBSTANTIALLY CONSTANT TEMPERATURE
Alvis R. Knowles, Los Angeles, Calif., assignor to Eldon Industries, Inc., Hawthorne, Calif., a corporation of California
Filed Sept. 16, 1968, Ser. No. 759,859
Int. Cl. F27b 14/06; F27d 11/02
U.S. Cl. 219—425                             7 Claims

ABSTRACT OF THE DISCLOSURE

A device is disclosed for heating a composition and for maintaining the heated composition at a substantially constant temperature. The device has a base which holds a replaceable electric heating element and an adjustable thermostat. The heating element and the thermostat are conneced in series so that the thermostat regulates the operation of the heating element. A container is located so as to receive heat from the element and so as to transmit heat to the thermostat. A rotatable ring is mounted on the base for use in mechanically adjusting the thermostat. Preferably this ring forms a part of the cover or housing for the completed device.

BACKGROUND OF THE INVENTION

This invention pertains to devices for heating a composition and for subsequently maintaining such a composition at a substantially constant temperature. The devices of this invention are primarily intended to be utilized as so-called solder pots in heating solder to a molten condition within a limited temperature range and then in maintaining the solder within this temperature range. Solder pots which can contain molten solder are frequently needed in performing certain assembly and similar operations in electronic and other industries.

To be effective, devices of this type to which this invention pertains must be adjustable so that they can be used in maintaining compositions at different temperatures. The importance of this will be realized from a consideration of the fact that different alloys such as may be designated by the generic term "solder" melt at different temperatures. The importance of this will also be realized from a consideration of the fact that solder may be used at diffierent temperatures for various different purposes.

Another important factor pertaining to devices for heating a composition and for subsequently maintaining such a composition at a substantially uniform temperature is the cost of any such device. To be available for wide utilization any such device must be relatively inexpensive. It will be realized that frequently desired or needed equipment will not be purchased if such equipment is realtively expensive.

Devices of the type indicated must of course also be capable of giving prolonged, reliable service if they are to be accepted. Although there may be a need for a device and such a device may be economically accepted, such a device will not normally be purchased unless a purchaser knows that it will perform satisfactorily over a prolonged period. Similarly, normally a purchaser will not normally purchase a device unless the device is of a character that it may be easily and conveniently used.

SUMMARY OF THE INVENTION

An object of the present invention is to provide new and improved devices for heating a composition to within predetermined temperature ranges and then for maintaining such a composition at a substantially constant temperature. A related objective of this invention is to provide devices of this category which are particularly adapted to be used with solder and which can therefore be referred to as solder pots.

Further objectives of this invention are to provide devices of the type indicated which may be easily and conveniently constructed, which are adjustable so that the temperature range of operation of these devices may be changed, which are easily and conveniently used, which are capable of giving prolonged, effective service and although these devices seldom require repair or servicing, which can be easily and conveniently repaired or serviced.

In accordance with this invention these and various other objectives of the invention which will be apparent from a careful consideration of this specification are achieved by providing devices, each of which includes a base holding an electric heating element and a thermostat connected in series to the element. Within a device of this invention a container is located so as to receive heat from the heating element and so as to transmit heat to the thermostat. Preferably such a device is constructed so that both the heating element and the container may be easily and conveniently removed and replaced and so that a standard heating element used for other purposes such as in soldering irons or woodburning tools can be employed as the heating element. Preferably, the thermostat used is adjustable and the device is constructed so that a ring forming a part of the housing device may be turned in order to mechanically accomplish adjustment of this thermostat.

BRIEF DESCRIPTION OF THE DRAWING

A brief summary of this type cannot fully and completely indicate all of the details of a device of this invention. Such other details are best explained with reference to the accompanying drawings in which:

FIG. 1 is an isometric view of a presently preferred embodiment or form of a device of this invention;

FIG. 2 is a top plan view of the base of this device with the divider plate used in connection with the device removed;

FIG. 3 is a side elevational view of this device with the cover forming a part of the housing of this device removed, part of this view being broken away so as to indicate various constructional details;

FIG. 4 is a partial side elevational view taken in FIG. 3; and

FIG. 5 is a top plan view of the device with the cover removed, part of this view being broken away so as to indicate certain constructional details.

It will be realized that other differently appearing devices for heating a composition and for maintaining the so-heated composition at a substantially constant temperature may be designed on the basis of the illustrated device for this purpose through the use or exercise of routine engineering skill. For this reason the accompanying drawing and the subsequent description of the illustrated device are not to be taken as limiting this invention.

DESCRIPTION OF THE PREFERRED EMBODIMENT

In the drawings there is shown a presently preferred embodiment or form of a device 10 for heating a composition and for maintaining a so-heated composition at an elevated temperature. The device 10 is primarily intended to be utilized in heating solder to a molten state and in maintaining the heated solder in this condition. Because of this utilization the device 10 is primarily referred to as a solder pot. It is to be understood, however, that this particular device may be utilized with other compositions which are significantly different from solder such as various hot melt adhesives.

The device 10 may include a base plate 12 which is designed so as to tend to prevent tipping of this completed device. A base 14 is mounted on the base plate 12 when this base plate 12 is used. The base 14 rotatable carries an adjustment ring 16 as hereinafter described. This adjustment ring 16 in turn carries a rotatable cover 18 which extends around an exposed container 20. The base 14, the ring 16 and the cover 18 may be considered as defining a housing for the completed device 10.

The base 14 is provided with an internal cavity 22 within which there is mounted a conventional socket 24 of the screw-in type commonly used with electrical items such as the bases of screw-in electric heating element, light bulbs and the like. This socket 24 may, however, be of any conveniently available type. Preferably it is of such a character that the base 26 of an electric heating element 28 used with it may be easily and quickly attached or detached with respect to it. When the socket 24 is of the screw-in type the base 26 should be of the same type.

The heating element 28 used with this device 10 is preferably of a common-known type such as is normally used in various common soldering irons, wood burning tools and the like. The use of such a type of heating element 28 makes it possible to achieve certain economies in the manufacture of the complete device 10. The use of such a heating element also makes it possible to utilize within this device 10 different heating elements of different specific heat production capacities for different applications or uses of the device 10.

The heating element 28 shown includes an upwardly directed internally threaded end 30 which is employed to support the container 20. This container 20 includes a threaded base 32 which is threaded into the end 30 in such a manner that this container 20 receives heat by direct conduction from the heating element 28 when the device 10 is utilized. A small flange 34 on the exterior of the container is preferably utilized to support an electrically non-conductive washer 36 of a heat resistant material. This washer 36 fits under adjacent portions of the cover 18 so as to tend to insulate the cover 18 from the container 20.

The socket 24 extends through a centrally located opening 38 in a divider plate 40 located over the cavity 22 in the base 14. This divider plate 40 is secured in place by means of three different screws 42, each of which rotatably carries a roller 44. The rollers 44 are provided with peripheral grooves 46 which serve to support the adjustment ring 16 as hereinafter described in such a manner so that it can be rotated. Two of these screws 42 also secure in place on the base 14 a mounting arch or yoke 48 in such a manner that this arch 48 extends upwardly within the cover 18 adjacent to, but spaced from the heating element 28.

The adjustment ring 16 has a curved, more or less conically shaped surface 50 and carries an internal flange 52 which fits within the grooves 46 on the roller 44 in such a manner that this ring 16 may be easily rotated. The ring 16 also includes an edged lip 54 which fits over the edge of the base 16 so as to provide a neat appearance of the entire device. If desired, the edge 56 of the base 14 can be formed so as to in effect serve as a support bearing for the lip 54 of this ring 16.

A shaft 58 is located generally within the arch 48 so that an end 60 of this shaft extends through an opening 62 in the divider plate 40 and so that the other end 64 of the shaft 58 extends into an internally threaded bushing 66. This other end 64 is threaded within the bushing 66. This shaft 58 carries intermediate these ends a gear sector 68 having teeth meshing with gear teeth 70 formed on a part of the flange 52 on the adjustment ring 16. Because of the presence of these teeth 70 the adjustment ring 16 can be referred to as being a partial ring gear or a partial internal ring gear.

With this structure a small coil spring 72 is disposed between the gear sector 68 and the divider plate 40 so as to tend to bias the shaft 58 and all parts supported by or contacted by this shaft in an upward direction away from the base 14. It will be noted that the bushing 66 extends through an opening 74 in the arch 48. This permits the bushing 66 to be freely moved with respect to this arch 48 through the action of the spring 72.

This bushing 66 is connected to a small plate 76 which has a terminal aperture (not separately numbered) extending around an upstanding rivet 78 attached to the top of the arch 48 so as to extend therefrom. This rivet 78 carries a unitary assembly consisting of three electrical insulators 80, a portion of the plate 76, the ends of two switch arms 82 and 84 and an uppermost metal mounting washer 86 which secures an end of a conventional bimetal arm 88 in place. It will be noted that the arms 82, 84 and 88 extend generally parallel to one another and except as hereinafter indicated are insulated from one another.

The arm 88 carries at its extremity remote from the washer 86 a small electrically non-conductive projection 90 which is capable of engaging an extremity of the arm 82 remote from the insulators 80 during the operation of the device 10. This arm 82 carries adjacent to this extremity a switch contact 92 which is adapted to mate with a corresponding contact 92 on the adjecent portion of the arm 84.

A small opening 94 in the arm 82 is provided for the purpose of permitting an electrically non-conductive projection 96 extending from the bushing 66 to contact the switch arm 84 so as to determine the position of this switch arm relative to the plate 76. The projection 96 preferably includes a head 98 abutting against the end 64 of the shaft 58. This head 98 is sufficiently large so as to be incapable of passing through the plate 76.

Within this structure appropriate electric wires 100 lead into the base 14 and are utilized in conjunction with conventional terminal lugs 102 to connect the arms 82 and 84 in series with the socket 24. One of these wires 100 may be connected directly to the base 14 by a screw 101 if desired for the purpose of grounding the device 10.

With this structure the assembly of the insulators 80 and arms 82, 84 and 88 and the plate 76 and the bushing 66 may be referred to as an adjustable thermostat since as the arm 88 is heated it will tend to bend downwardly to physically adjust the position of the arm 82 relative to the arm 84. If the amount of such movement is sufficient, the contacts 92 will be opened, cutting off current flow in the series circuit including the socket 24 and the heating element 28 held by this socket. By virtue of the fact that the insulation 80 and the arms 82, 84 and 88 are movable on the rivet 78 and that the bushing 66 is movable with respect to this arch 48, this entire assembly can be moved. Normally as heat is supplied to this assembly (which may be referred to as a thermostat) from the container 20 by conduction since the spring 72 biases this assembly upwardly so that the washer 86 directly bears against the container 20. This assembly also receives some heat by radiation and to some degree by convection.

Because of an overlapping fit between the teeth on the sector gear 68 and the gear teeth 70, such up and down motion of the assembly referred to in the preceding will not cause disengagement of these two gears. As a result of this it is possible to turn the adjustment ring 16 at any time so as to cause rotation of the shaft 58. This in turn will cause the end 64 of this shaft 58 to bear against the head 98 of the projection 96, moving this projection 96 into contact with the switch arm 84.

Such movement will cause a relative shift in positions of the contacts 92 which is independent of any movement of the arm 58. As the result of this, it is possible to regulate the temperature range within which movement of the arm 88 will cause the contacts 92 to either be against one another or to be spaced from one another. This effect provides a very convenient, simple, effective means of adjusting what has been pointed out above as constituting a thermostat.

In order to facilitate such an adjustment, a small pointer 104 may be located on the adjustment ring 16 in such a manner as to indicate a temperature on an appropriate scale 106 located on the base 14. This base 14 preferably includes stop members 108 past which the pointer 104 cannot be moved in order to prevent any possibility of the adjustment ring 16 being moved past the normal range of movement permitted by the sector gear 68 and the gear teeth 70. This of course corresponds to the movement of the projection 96 permissible within the device 10.

The utilization of this complete device 10 is comparatively simple. When electric power is applied to the wires 100, the contacts 92 are normally against one another when the device is cold. Since these contacts are connected in series with the heating element 28 this element 28 will become hot. Heat from it will be conducted upwardly to the container 20. Such heat will be received from the container 20 by the bi-metal arm 88 causing this arm to bend downwardly so that the projection 90 bends the arm 82 to a sufficient degree that the contacts 92 are separated. As this occurs, some heat will of course be received by the arm 88 from the heating element 28 and from other parts of the device. Such quantities of heat are sufficiently minor so that they can be ignored.

When the contacts 92 are opened in this manner the circuit including the heating element 28 is of course also opened. As a result all parts of this device 10 will gradually cool through natural dissipation of heat until such time as the arm 88 cools and as a result of such cooling moves sufficiently so that the contacts 92 again mate with one another. At this point the sequence of operation indicated in the preceding will occur until such time as the arm 88 again moves so as to open the contacts 92.

During such a series of on-off cycles the adjusting ring 16 may be turned at any time so as to vary the temperature or temperature range at which such cycles occur. Preferably openings 110 in the surface 50 of this ring 16 provide a knurling type of effect facilitating rotation of this ring. These openings 110 are also considered to facilitate heat loss from the ring 16 itself so that this ring will remain at a low enough temperature that it may be easily and safely engaged by the hand.

By virtue of the construction of the device 10 the heating element 28 and the container 20 can easily be removed by removing the cover 18. Thus, with this device 10 it is possible to replace the heating element and/or the container 20 with a minimum of difficulty. Normally this will not be necessary, but it is a desirable feature of the invention because on occasion it may be desired to utilize within the device 10 different heating elements of different power consumptions and/or different containers for different specific materials. Although not normally necessary, if required the device 10 may be easily repaired because of its construction.

It will be realized that a number of changes may be made in the construction shown and described through the use and exercise of routine engineering skill. Because of this the present invention is considered as being limited solely by the appended claims forming a part of this disclosure.

What is claimed is:

1. A device for heating a composition and for maintaining the so-heated composition at an elevated temperature which includes:
   a base;
   an electric socket means mounted on said base;
   a replaceable electric heating element mounted on said socket means so as to extend from said base;
   a container carried by an extremity of said heating element remote from said base, said container being capable of receiving heat from said heating element during the operation of said device;
   thermostat means located on said base so as to receive heat from said container;
   electrical conductors connecting said socket and said thermostat means in series so that said thermostat means controls the operation of said heating element during the use of said device;
   said thermostat means being adjustable so as to be capable of regulating the temperature of said container so that said container can be maintained at different temperatures;
   movable means connected to said thermostat means for adjusting said thermostat means;
   said movable means extending to the exterior of said device;
   said movable means comprises a rotatable ring extending to the exterior of said device;
   gear teeth located on said ring;
   gear means rotatably mounted on said base and mating with said gear teeth; and
   mechanical means connecting said gear means and said thermostat means for adjusting said thermostat means.

2. A device as claimed in claim 1 wherein:
   said thermostat means is movable with respect to said container and including;
   spring means biasing said thermostat means against said container so that said thermostat means will receive heat from said container by conduction.

3. A device for heating a composition and for maintaining the so-heated composition at an elevated temperature which includes:
   a base;
   an electric heating element positioned on said base so as to extend therefrom;
   an adjustable thermostat means connected in series with said heating element;
   a solder container located above said base so as to receive heat from said heating element and so as to transfer heat to said thermostat means;
   a ring rotatably mounted on said base;
   gear teeth located on said ring;
   gear means rotatably mounted on said base and mating with said gear teeth;
   mechanical means connecting said gear means and said thermostat means for adjusting said thermostat means.

4. A device as claimed in claim 3 including:
   spring means biasing said thermostat means against said container.

5. A device as claimed in claim 3 including:
   a housing for said device, the top of said container being exposed by said housing;
   said base and said ring forming a part of said housing and being exposed to the exterior of said device.

6. A device as claimed in claim 5 wherein:
said ring contains holes leading from the interior of said housing to the exterior of said housing, said holes serving to dissipate heat from said ring.

7. A device as claimed in claim 3 including:
spring means biasing said thermostat means against said container;
a housing for said device, the top of said container being exposed by said housing;
said base and said ring forming a part of said housing and being exposed to the exterior of said device;
said ring contains holes leading from the interior of said housing to the exterior of said housing, said holes serving to dissipate heat from said ring.

References Cited

UNITED STATES PATENTS

| 2,502,764 | 4/1950 | Taft | 219—421 |
| 2,622,186 | 12/1952 | Hutchens | 219—430 |
| 2,708,710 | 5/1955 | De Verter | 219—424 |
| 2,817,744 | 12/1957 | Free | 219—439 |
| 3,010,006 | 11/1961 | Schwaneke | 219—442 |

VOLODYMYR Y. MAYEWSKY, Primary Examiner

U.S. Cl. X.R.

219—426, 430, 439, 442